United States Patent [19]
Omo et al.

[11] Patent Number: 6,144,460
[45] Date of Patent: Nov. 7, 2000

[54] DATA PROCESSING METHOD, AND DATA PROCESSOR AND PRINTER USING DATA PROCESSING METHOD

[75] Inventors: Shinichi Omo, Kawasaki; Hiroshi Fukui, Yokosuka; Akira Kuronuma, Kawasaki; Takayuki Murata, Kawasaki; Masahiko Umezawa, Kawasaki, all of Japan

[73] Assignee: Canon Kabushiki Kaisha, Tokyo, Japan

[21] Appl. No.: 08/961,244

[22] Filed: Oct. 30, 1997

[30] Foreign Application Priority Data

Nov. 5, 1996 [JP] Japan .................................. 8-292549

[51] Int. Cl.⁷ .................................................. G06K 15/00
[52] U.S. Cl. .......................................... 358/1.16; 358/1.13
[58] Field of Search ................................. 358/1.16, 1.17, 358/1.1, 1.2, 1.6, 1.8, 1.9, 1.12, 1.13, 1.14, 1.15, 1.18, 468; 710/22, 28, 107, 112, 115, 117, 127, 66, 264; 347/88; 345/502

[56] References Cited

U.S. PATENT DOCUMENTS

| | | | |
|---|---|---|---|
| 4,122,520 | 10/1978 | Adamchick et al. | 364/200 |
| 4,313,124 | 1/1982 | Hara | 346/140 |
| 4,345,262 | 8/1982 | Shirato et al. | 346/140 |
| 4,459,600 | 7/1984 | Sato et al. | 346/140 |
| 4,463,359 | 7/1984 | Ayata et al. | 346/1.1 |
| 4,467,447 | 8/1984 | Takahashi et al. | 364/900 |
| 4,558,333 | 12/1985 | Sugitani et al. | 346/140 |
| 4,558,410 | 12/1985 | Holzner et al. | 346/200 |
| 4,608,577 | 8/1986 | Hori | 346/140 |
| 4,723,129 | 2/1988 | Endo et al. | 346/1.1 |
| 4,740,796 | 4/1988 | Endo et al. | 346/1.1 |
| 4,953,103 | 8/1990 | Suzuki | 358/1.16 |
| 4,965,748 | 10/1990 | Chang et al. | 710/66 |
| 4,977,519 | 12/1990 | Chang et al. | 358/1.2 |
| 5,072,365 | 12/1991 | Burgess et al. | 710/264 |
| 5,119,480 | 6/1992 | Garcia, Jr. et al. | 710/107 |
| 5,274,780 | 12/1993 | Nakao | 710/107 |
| 5,278,965 | 1/1994 | Fujihira et al. | 710/22 |
| 5,333,294 | 7/1994 | Schnell | 395/425 |
| 5,404,481 | 4/1995 | Miyamori | 710/22 |
| 5,539,917 | 7/1996 | Jirgal | 710/22 |
| 5,564,117 | 10/1996 | LEntz et al. | 345/502 |
| 5,579,453 | 11/1996 | Lindenfelser et al. | 358/1.16 |
| 5,630,163 | 5/1997 | Fung et al. | 710/127 |
| 5,689,659 | 11/1997 | Tietjen et al. | 710/127 |
| 5,793,397 | 8/1998 | Barker et al. | 347/88 |
| 5,953,132 | 9/1999 | Kurosawa | 358/468 |
| 5,953,501 | 9/1999 | Hattori | 358/1.16 |

FOREIGN PATENT DOCUMENTS

| | | |
|---|---|---|
| 0 340 972 A2 | 8/1989 | European Pat. Off. . |
| 5456847 | 10/1977 | Japan . |
| 59-123670 | 7/1984 | Japan . |
| 59-138461 | 8/1984 | Japan . |
| 60-71260 | 4/1985 | Japan . |
| WO9312486A | 6/1993 | WIPO . |

*Primary Examiner*—Arthur G. Evans
*Attorney, Agent, or Firm*—Fitzpatrick, Cella, Harper & Scinto

[57] ABSTRACT

A data processing method which efficiently performs data transfer by using a data bus with an appropriate access width corresponding to transfer data and a printer using the data processing method. In the printer, a CPU bus 70 having a 16-bit physical bus width, is shared by a CPU 21 and a DMAC 80. In a case where the CPU 21 accesses a memory via the CPU bus 70 with an 8-bit width, while the DMAC 80 accesses the memory via the CPU bus 70 with a 16-bit width, each time the DMAC 80 needs to access the memory, the DMAC 80 issues a DMA request signal to the CPU 21, requiring an exclusive access right for the CPU bus 70. In accordance with the request signal, the CPU 21 delivers the exclusive access right for the CPU bus 70 to the DMAC 80. Then the DMAC 80 controls memory access with the 16-bit width.

25 Claims, 9 Drawing Sheets

F I G. 4

| OPERATION MODE | DMA PERMISSION SIGNAL | A0 | SELECTOR 83 | SELECTOR 84 | SELECTOR 85 |
|---|---|---|---|---|---|
| FIRST MODE (ACCESS BY CPU) | L | L | a | a | a |
|  |  | H | a | b | b |
| SECOND MODE (ACCESS BY DMA) | H | — | b | c | c |

FIG. 7

| OPERATION MODE | WAIT | A0 | SELECTOR 83 | SELECTOR 84 | SELECTOR 85 |
|---|---|---|---|---|---|
| FIRST MODE (ACCESS BY CPU) | L | L | a | a | a |
|  |  | H | a | b | b |
| SECOND MODE (ACCESS BY DMA) | H | — | b | c | c |

DATA PROCESSING METHOD, AND DATA PROCESSOR AND PRINTER USING DATA PROCESSING METHOD

BACKGROUND OF THE INVENTION

This invention relates to data processing method, and data processor and printer using the data processing method and, more particularly to a data processing method which is used when image data is received from a host computer and printing is performed based on the received data, and data processor and printer using the data processing method.

In recent years, the printing resolution of printers has increased, and with the progress of high-speed printing technique, a huge amount of print data is transferred from a host computer. To bitmap this huge amount of print data in a buffer of the printer, conventionally, a high-speed CPU has been employed, otherwise, the unit of data to be handled or the unit of transfer data has been increased (for example, from 8 bits to 16 or 32 bits), otherwise, a hardware dedicated to DMA processing has been employed for data transfer, thus realizing high-speed data processing.

However, in the above conventional techniques, if the transfer bus width is widened to perform high-speed processing by using the hardware dedicated to DMA transfer, the bus width of a CPU bus is also widened in correspondence with the transfer bus width. In this case, the wide CPU bus is used even in data transfer between the CPU and a ROM storing control programs, in which the amount of data is not so large as that of print data transfer and therefore such wide bus width is not required. This means that the data transfer bus for access to the ROM is enhanced, and as a result, the cost of manufacture of a controller increases.

SUMMARY OF THE INVENTION

Accordingly, it is an object of the present invention to provide data processing method which enables efficient data transfer by using a data bus with an appropriate bus width corresponding to transfer data, and data processor and printer both using the data processing method.

According to one aspect of the present invention, the foregoing object is attained by providing a data processing method for accessing a memory by a CPU and a DMA controller via a bus with an N-bit physical bus width, comprising: a first access step of executing a first mode in which the CPU accesses the memory with an N1-bit width; a second access step of executing a second mode in which the DMA controller DMA-accesses the memory with an N2-bit width; and a switching step of switching between execution of the first mode and that of the second mode, such that the CPU or the DMA controller which has an exclusive access right for the bus can execute memory access, wherein N, N1 and N2 are respectively positive integers, N2 is greater than N1, and N is equal to or greater than N2.

According to another aspect of the present invention, the foregoing object is attained by providing a data processing apparatus for accessing a memory by a CPU and a DMA controller via a bus with an N-bit physical bus width, comprising: first access means for executing a first mode in which the CPU accesses the memory with an N1-bit width; second access means for executing a second mode in which the DMA controller DMA-accesses the memory with an N2-bit width; and switching means for switching between execution of the first mode and that of the second mode, such that the CPU or the DMA controller which has an exclusive access right for the bus can execute memory access, wherein N, N1 and N2 are respectively positive integers, N2 is greater than N1, and N is equal to or greater than N2.

According to still another aspect of the present invention, the foregoing object is attained by providing a printer which accesses a memory by using a CPU and a DMA controller, comprising: a CPU bus with an N-bit physical bus width shared by the CPU and the DMA controller; input means for inputting print data from an external device; switching means for switching an exclusive access right for the CPU bus, depending on whether executing a first mode in which the CPU accesses the memory via the CPU bus with an N1-bit width to handle the print data, or executing a second mode in which DMA controller accesses the memory via the CPU bus with an N2-bit width to handle the print data; and printing means for performing printing on a print medium, based on the print data, wherein N, N1 and N2 are respectively positive integers, N2 is greater than N1, and N is equal to or greater than N2.

It may be arranged such that, in a case where normally the CPU has an exclusive access right for the CPU bus, and the DMA controller needs to access the memory, the DMA controller issues a signal requiring the exclusive access right for the CPU bus to the CPU, and in response to the signal, the CPU issues a permission signal to deliver the exclusive access right for the CPU us to the DMA controller.

It may be also arranged such that, in a case where the DMA controller usually has an exclusive access right for the CPU bus, and the CPU needs to access the memory, the CPU issues a signal requiring the exclusive access right for the CPU bus to the DMA controller, and in response to the signal, the DMA controller issues a permission signal to deliver the exclusive access right for the CPU bus to the CPU.

Note that the above printing means has a printhead, and the printhead may be an ink-jet printhead which performs printing by discharging ink, or a printhead which discharges ink by utilizing thermal energy, and has a thermal-energy transducer for generating the thermal energy to be supplied to the ink.

Further, the printhead may be a printhead for color printing. In this case, the printhead comprises a first printhead for discharging yellow ink, a second printhead for discharging magenta ink, a third printhead for discharging cyan ink, and a fourth printhead for discharging black ink.

In accordance with the present invention as described above, when the CPU and the DMA controller access a memory via the bus having the N (N: a positive integer)-bit physical bus width, the first mode in which the CPU accesses the memory with N1 (N1: a positive integer)-bit width and the second mode in which the DMA controller accesses the memory with N2 (N2: a positive interger)-bit width are executed. At this time, one of the first mode and the second mode is selected such that the memory can be accessed from the CPU or the DMA controller which has received the exclusive access right for the bus. Note that "N2" is greater than "N1", and "N" is equal to or greater than "N2".

The invention is particularly advantageous since the bus is shared by the CPU and the DMA controller, the access width can be dynamically changed in accordance with access from the CPU or access from the DMA controller, and high-speed DMA access in accordance with necessity without changing the bus width becomes possible.

By this arrangement, in the printer, the data width in memory access can be dynamically changed in accordance with whether the CPU handles print data or the DMA controller handles the print data. This performs print data processing more efficiently, and as a result, improves the total throughput of the printer.

Other features and advantages of the present invention will be apparent from the following description taken in conjunction with the accompanying drawings, in which like reference characters designate the same name or similar parts throughout the FIGS. thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a table showing the operations of selectors 83 to 85;

FIG. 7 is a table showing the operations of selectors 83 to 85, according to the other embodiment;

DETAILED DESCRIPTION OF THE PREFERRED EMBODIMENTS

Preferred embodiments of the present invention will now be described in detail in accordance with the accompanying drawings.

Figure 1:
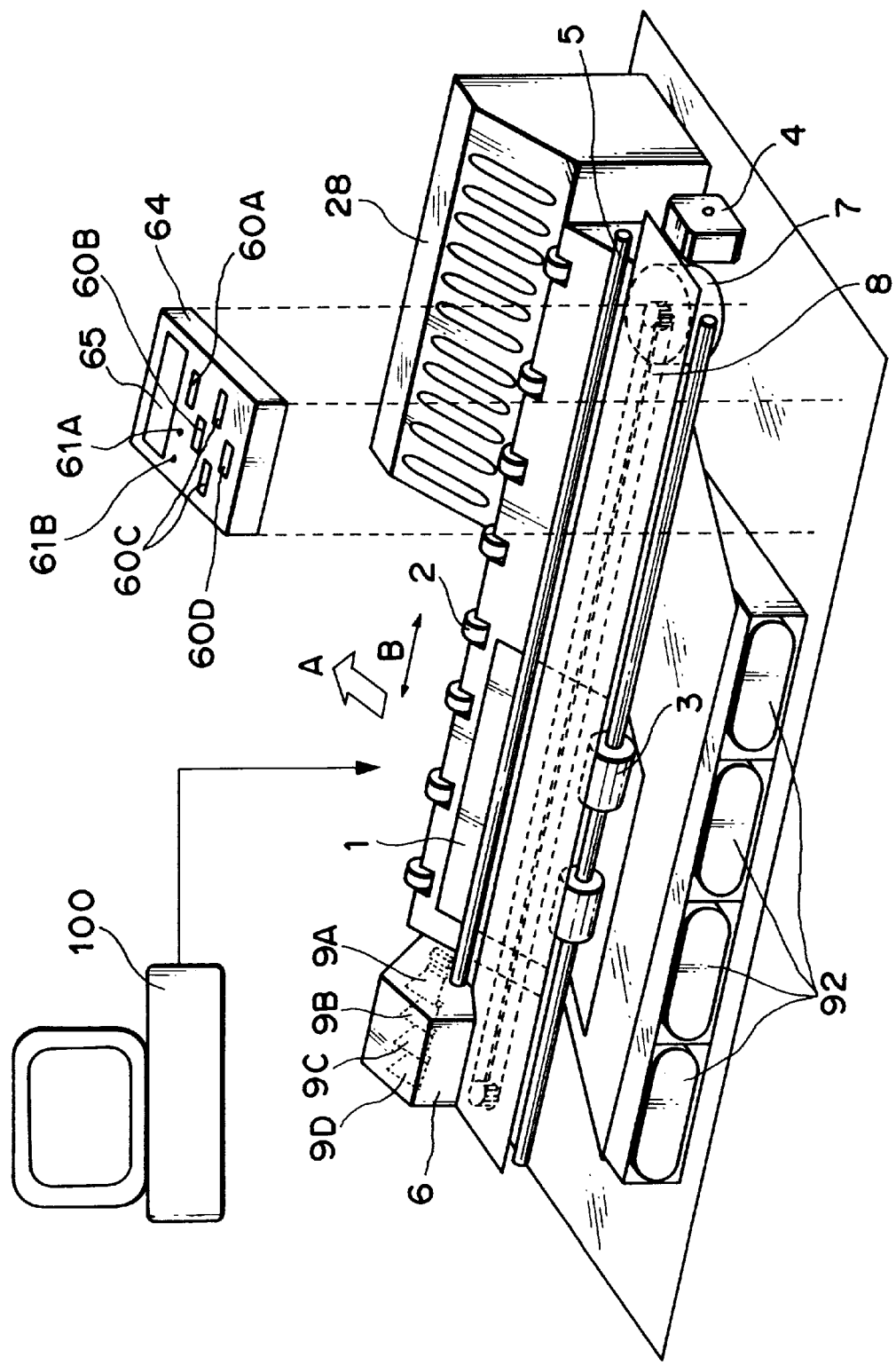
FIG. 1 is an external appearance perspective view showing the structure of a printer having a printhead which performs printing in accordance with an ink-jet method, as a typical embodiment of the present invention.

FIG. 1 is an external appearance perspective view showing a printer having a printhead which performs printing in accordance with an ink-jet method, as a typical embodiment of the present invention.

In FIG. 1, reference numeral 1 denotes a print paper (or a print medium such as a plastic sheet); 2 and 3, conveyance rollers provided on and under a print area of the print paper 1, for conveying the print paper 1 in the arrow A direction; 4, a sheet feed motor which drives the conveyance rollers 2 and 3; 5, a guide shaft provided between the conveyance roller 2 and 3 and parallel to the rotational axes of the conveyance rollers 2 and 3; 6, a carriage which scans (in the arrow B direction) along the guide shaft 5; 7, a carriage motor which scan-moves the carriage 6; and 8, a belt which transmits the driving force of the carriage motor 7 to the carriage 6.

The carriage 6 holds four printheads 9A to 9D (hereinafter referred to as "printhead 9" generally indicating these four printheads) which respectively perform printing by discharging ink droplets in accordance with an ink-jet method. The printhead 9 is a color printhead for color image printing and comprises four printheads, 9A (Y head), 9B (M head), 9C (C head) and 9D (K head), respectively corresponding to Y (yellow) color ink, M (magenta) color ink, C (cyan) color ink and K (black) color ink, arrayed along the scanning direction of the carriage 6. The printheads 9A to 9D respectively have a plurality of (e.g., 64 or 128) ink discharge orifices arrayed in a direction diagonal to the scanning direction of the carriage 6, on their front surfaces opposite to the print surface of the print paper 1. Note that these printheads 9A to 9D respectively have the same logic circuit construction.

An operation panel 64 is attached to an outer case (not shown) of the printer. The operation panel 64 has operation keys such as an online/off-line key 60A, a line feed key 60B, a print mode switch key 60C and a reset key 60D, LED lamps such as an alarm lamp 61A and a power source lamp 61B, and an LCD 65 which displays various messages.

Note that numeral 92 denotes an ink tank containing ink for printing a desired image on the print paper 1. The ink tank 92 has four compartments respectively containing yellow (Y) ink, magenta (M) ink, cyan (C) ink and black (K) ink, corresponding to the print heads 9A to 9D.

A controller including a CPU, ROM, RAM and the like of the printer receives an instruction signal or data signal (print information) from a host computer (hereinafter simply referred to as "host") 100, and drives the various motors and the like, and applies driving power (heating power) and energize electrothermal transducers (heaters) included in the printheads 9A to 9D, based on the received signal. The above operation will be described in more detail below.

Figure 2:
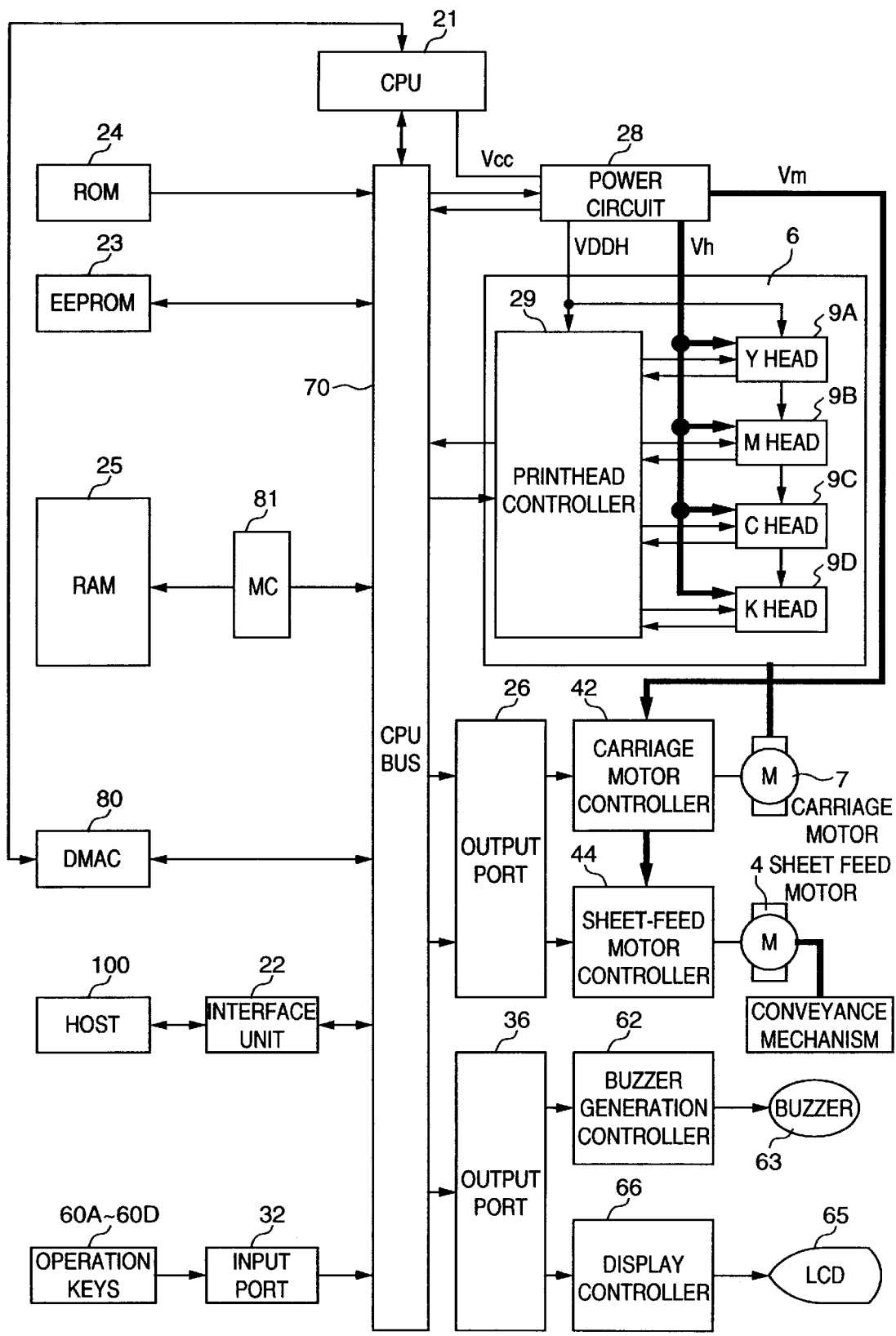
FIG. 2 is a block diagram showing the schematic construction of a controller of the printer in FIG. 1.

FIG. 2 is a block diagram showing the schematic construction of the controller of the printer in FIG. 1.

A CPU 21, in the form of microprocessor, is connected to the host 100 via an interface unit 22. The CPU 21 accesses a ROM 24 in which control programs are stored, an EEPROM 23 in which updatable control programs, processing programs, various constant data and the like are stored, and a RAM 25 in which an instruction signal (command) and a print information signal received from the host 100 via the interface unit 22 are stored, and controls printing operation based on the information stored in these memories.

Note that the processing executed by the above processing programs include: processing to transfer raster-format print data, received via the interface unit 22, to a work buffer of the RAM 25; processing to convert the arrangement of the print data stored in the work buffer in consideration of the array direction of printing elements of the printhead 9 (R-C (Raster-Column) conversion); decompression processing when compressed print information is received; processing to transfer print data bitmapped in the work area of the RAM 25 to a printhead controller 29; processing to count the number of print data (number of bits or bytes) to cause ink discharge among print data so as to estimate an ink consumption amount; processing, in case of multipath print control, to generate mask data corresponding to respective paths in the RAM 25 and transfer the mask data to the printhead 9; and processing to convert the resolution of low-resolution print data (e.g., 300 dpi), received from the host 100 and bitmapped in the work area of the RAM 25, into a higher resolution (e.g., 300 dpi→600 dpi) and smoothing processing to remove jaggy.

The CPU 21 moves the carriage 6 by driving the carriage motor 7 via an output port 26 and a carriage motor controller 42, and operates the conveyance mechanism such as the conveyance rollers 2 and 3 by driving the sheet feed motor 4 via the output port 26 and a sheet-feed motor controller 44.

Further, the CPU 21 drives the printheads 9A to 9D via the printhead controller 29, based on print information stored in the RAM 25, so as to print a desired image on the print paper 1.

Further, a power circuit 28 outputs a logic driving current voltage Vcc (e.g., 5 V) to drive the CPU 21, motor driving voltage Vm (e.g., 30 V) for the various motors, a heat voltage Vh (e.g., 25 V) to drive the printhead 9, and a backup voltage VDDH for protecting the printhead 9. The heat voltage Vh is applied to the printhead 9, and the backup voltage VDDH, to the printhead controller 29 and the printhead 9.

Further, an instruction inputted from the operation keys 60A to 60D is transferred to the CPU 21 via an input port 32, and when the instruction from the CPU 21 is transferred via an output port 36 to a buzzer generation controller 62, a buzzer 63 sounds an alarm, or when the instruction from the CPU 21 is transferred to a display controller 66, the LCD 65 displays a message.

Note that in FIG. 2, numeral 70 denotes a CPU bus interconnecting the above-described various components; 80, a DMA controller (DMAC) which performs high-speed data processing controls such as clearing the memory contents, logical inversion of the memory contents and the like; and 81, a memory controller (MC) which performs access control with respect to the RAM 25 in accordance with an instruction from the CPU 21 or the DMAC 80. The CPU bus 70 has a 16-bit physical transfer bus width, and its data transfer width is 8 bits or 16 bits in accordance with the control of the CPU 21 and the DMAC 80.

In this embodiment, the DMAC 80 performs DMA transfer when:

(1) raster-format print data, received from the host 100 via the interface unit 22, is transferred to the work buffer of the RAM 25;

(2) the RAM 25 is accessed for R-C conversion;

(3) compressed print information stored in the work buffer of the RAM 25 is read and decompressed;

(4) print data bitmapped in the work area of the RAM 25 is transferred to the printhead controller 29;

(5) print data bitmapped in the work area of the RAM 25 is accessed to count the number of print data (number of bits or bytes) to cause ink discharge so as to estimate an ink use amount;

(6) mask data for multipath print control is transferred from the RAM 25 to the printhead 9;

(7) low-resolution print data bitmapped in the work area of the RAM 25 is accessed and resolution conversion and/or smoothing is performed; and (8) others.

Figure 3:
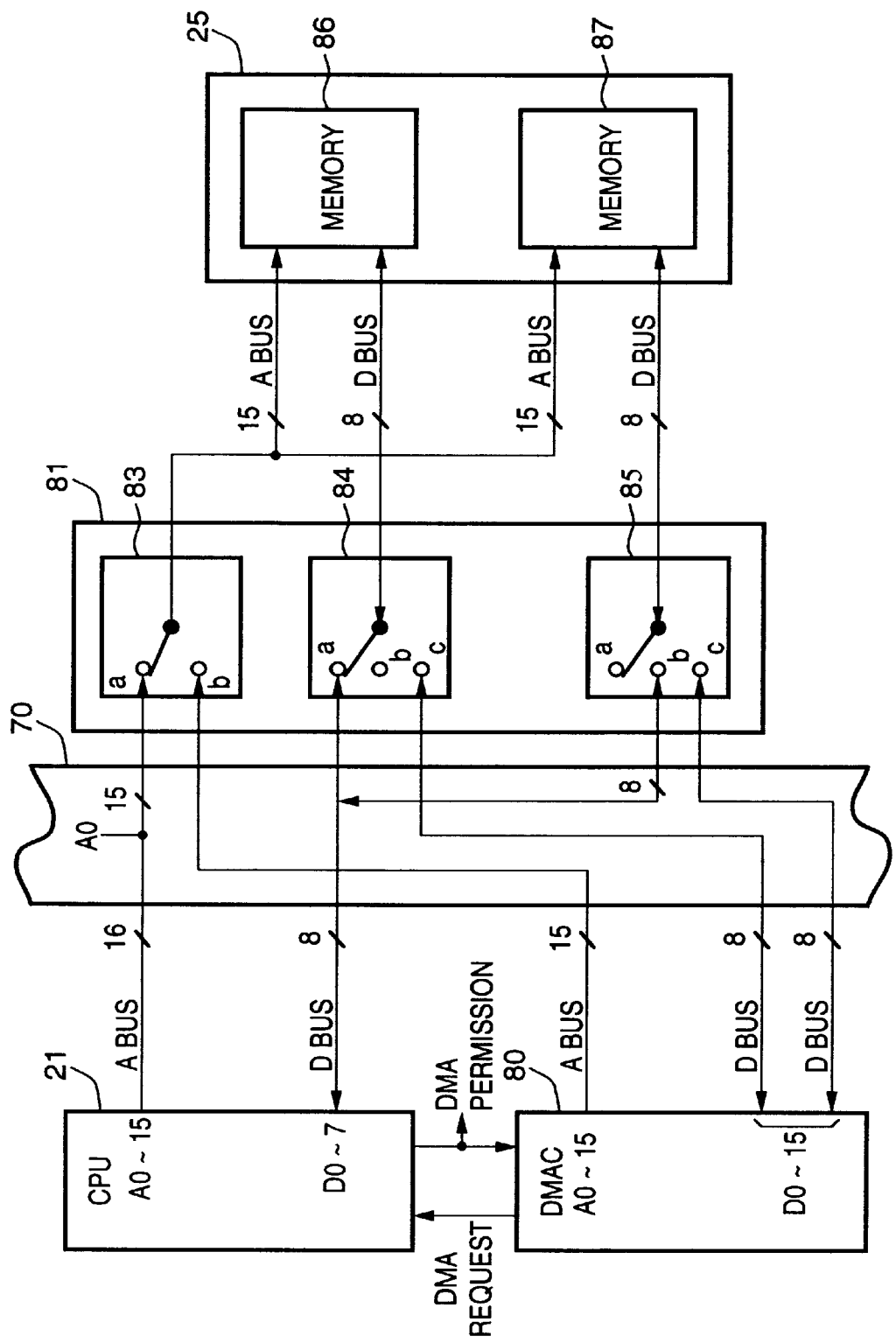
FIG. 3 is a block diagram showing data access and data transfer between a RAM 25, and a CPU 21 and a DMAC 80.

FIG. 3 is a block diagram showing data access and data transfer between the RAM 25, and the CPU 21 and the DMAC 80.

In this embodiment, the bus width when accessed by the CPU is 8 bits (N=8), while the bus width when accessed by the DMAC 80 is 16 bits (M=2).

In FIG. 3, numerals 83 to 85 denote selectors constituting the memory controller (MC) 81. The selectors 83 to 85 respectively comprise a logic circuit used for selecting an address bus or a data bus of the RAM 25 in accordance with two first and second modes (to be described later). Numerals 86 and 87 denote memories respectively defined in the RAM 25 as a work area for the CPU 21 or a storage area for storing print data and the like.

Further, in FIG. 3, "Abus" denotes the address bus; "Dbus", the data bus; and "A0", the least significant bit (LSB) of the Abus. When the RAM 25 is accessed by the CPU, the memory 86 or the 87 is selected, in accordance with the level of the bit A0.

The CPU 21 and the DMAC 80 are connected with each other via a path other than the CPU bus 70. The DMAC 80 issues a DMA request signal to the CPU 21, and in response to the DMA request signal, the CPU 21 returns a DMA permission signal to the DMAC 80.

Further, as shown in FIG. 3, address designation from the CPU 21 and the DMAC 80 via the address bus (Abus) to the memories 86 and 87 is made with a 16-bit width (A0–A15), while data transfer between the CPU 21 and the memories 86 and 87 via the data bus (Dbus) is made with an 8-bit width (D0–D7), and data transfer between the DMAC 80 and the memories 86 and 87 via the data bus (Dbus) is made with a 16-bit width (D0–D15).

FIG. 4 is a table showing the operations of the selectors 83 to 85.

(1) First Mode (access by CPU)

First, in the first mode (normal mode) in which the CPU 21 performs accessing operation to perform various controls of the printer, the signal level of the DMA permission signal is "L". As shown in FIG. 4, in case of A0="L", the selector 83 selects a terminal a, the selector 84 selects a terminal a, and the selector 85 selects a terminal a, thus the memory 86 becomes accessible. In case of A0="H", the selector 83 selects the terminal a, the selector 84 selects a terminal b, and the selector 85 selects a terminal b, thus the memory becomes accessible.

(2) Second Mode (access by DMAC)

On the other hand, when high-speed processing such as clearing of an image area of the memory by the DMAC 80 by DMA processing is required, the DMAC 80 issues the DMA request signal to the CPU 21, requiring the CPU 21 to release the CPU bus 70 so as to use the memory 86 or 87. In response to the request signal, the CPU 21 turns the signal level of the DMA permission signal to "H" to inform that the CPU bus 70 has been released at a convenient stop of execution of instruction.

The DMAC 80 finds that the signal level of the DMA permission signal turns to "H", and as shown in FIG. 4, the selector 83 selects a terminal b, the selector 84 selects a terminal c, and the selector 85 selects a terminal c, thus the memories 86 and 87 both become accessible. At this time, the data bus has the 16-bit width for high-speed processing.

When the DMA access processing by the DMAC 80 has been completed, the DMAC 80 resets the DMA request signal and releases an exclusive access right for the CPU bus 70. In response to this release, the CPU 21 turns the signal level of the DMA permission signal to "L" to obtain the exclusive access right for the CPU bus 70. Then, the first mode is restored.

The above operations are shown in the time sequence of FIGS. 5A–5E. In FIGS. 5A–5E, the exclusive access right for the CPU bus 70 is delivered between the CPU 21 and the DMAC 80 in accordance with the signal level of the DMA permission signal transmitted between the CPU 21 and the DMAC 80, and the data bus width in memory access is dynamically changed.

Figure 5:
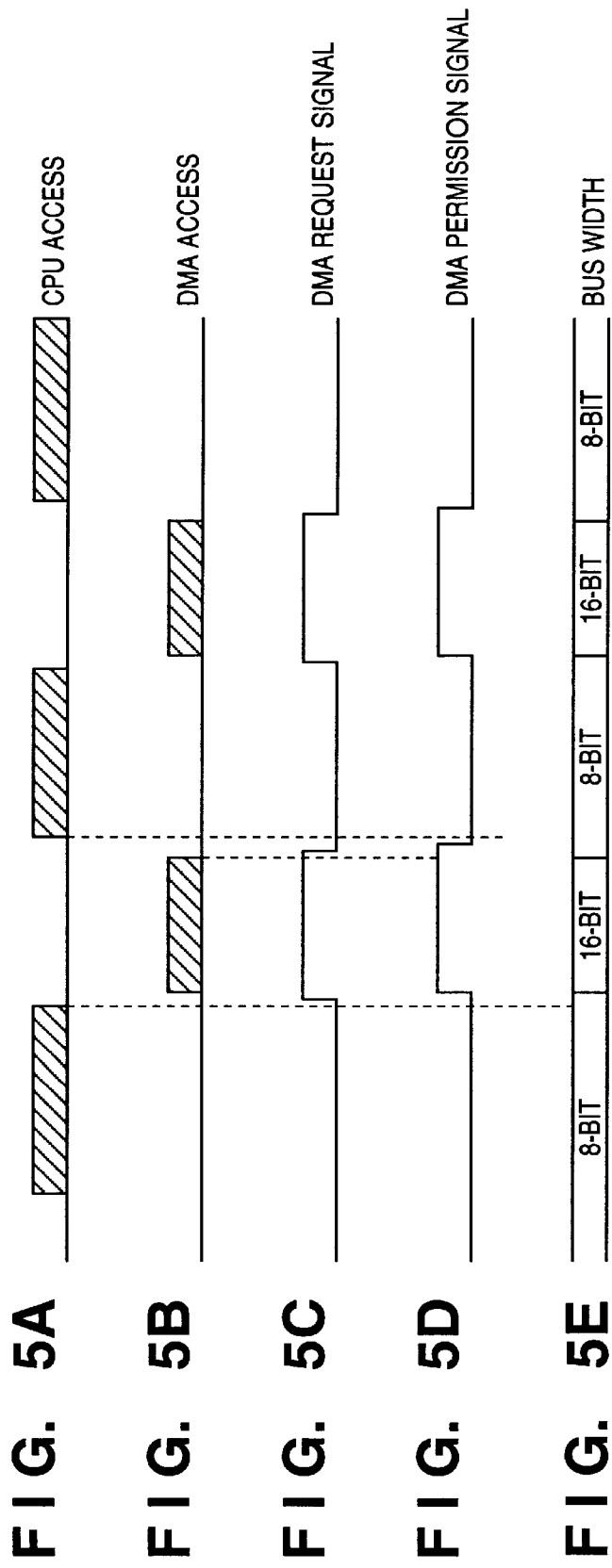
FIGS. 5A, 5B, 5C, 5D and 5E are timing charts showing a time sequence of bus width changing.

Note that FIG. 5A shows a time variation of CPU access; FIG. 5B: a time variation of DMA access; FIG. 5C: a time variation of a DMA request signal; FIG. 5D: a time variation of a DMA permission signal; and FIG. 5E: a time variation of a CPU bus width.

According to the above-described embodiment, the data bus width can be changed corresponding to memory access from the CPU 21 or memory access from the DMAC 80, in accordance with the signal level of the DMA permission signal transmitted between the CPU 21 ad the DMAC 80.

ANOTHER EMBODIMENT

In the above embodiment, the CPU 21 or the DMAC 80 is operable at arbitrary timing by the time sharing operations of the CPU 21 and the DMAC 80, i.e., delivering the exclusive access right between the CPU 21 and the DMAC 80.

Next, a construction where the CPU 21 and the DMAC 80 are concurrently operable as long as access conflict does not occur will be described.

Figure 6:
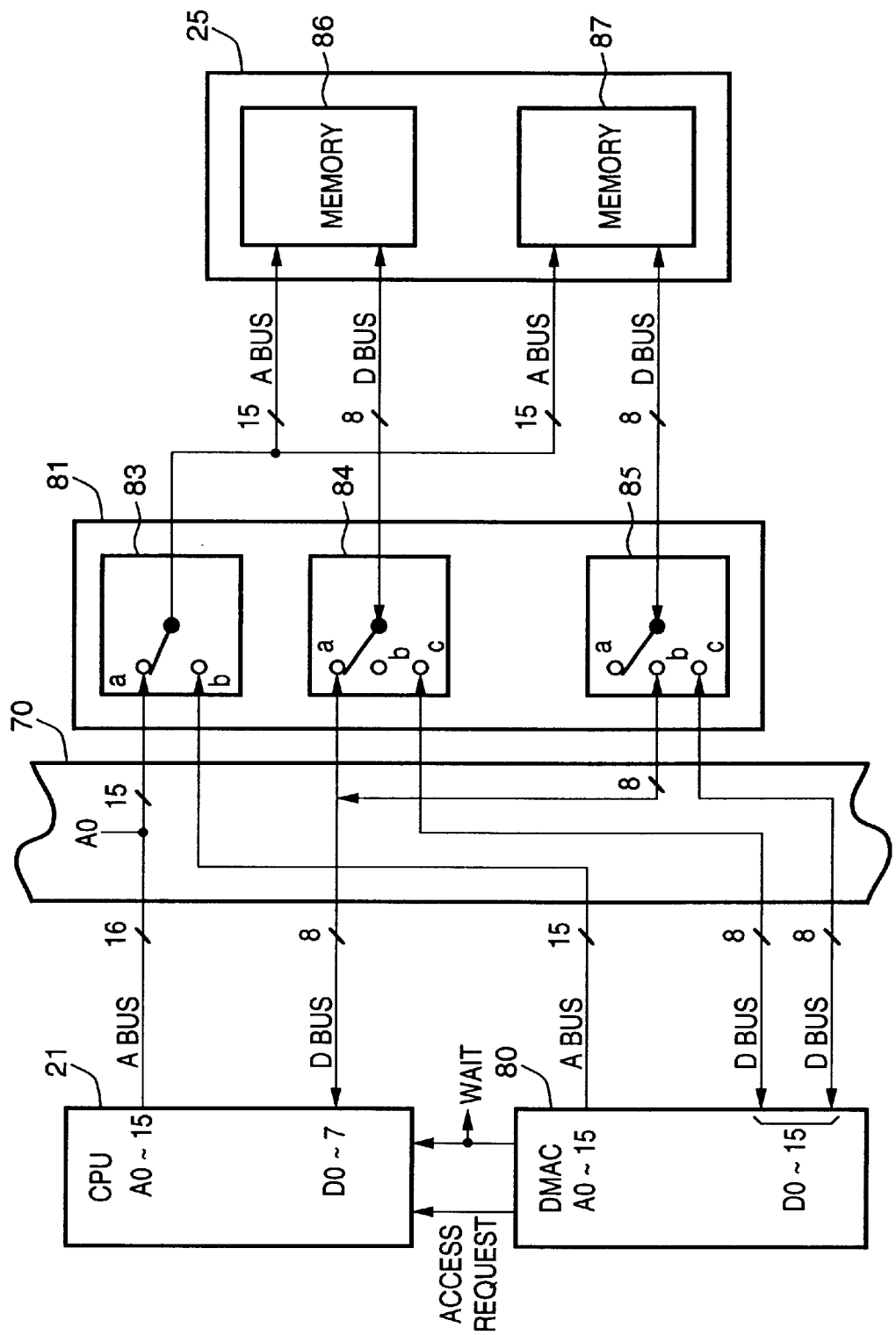
FIG. 6 is a block diagram showing data access and data transfer between a RAM 25, and a CPU 21 and a DMAC 80, according to another embodiment.

FIG. 6 is a block diagram showing data access and data transfer between the RAM 25, and the CPU 21 and the DMAC 80. In FIG. 6, the elements corresponding to those described in the previous embodiment have the same reference numerals and names, and the explanation of those elements will be omitted.

In the construction shown in FIG. 6, the CPU 21 usually accesses its internal memory (not shown) but does not access the memories 86 and 87. On the other hand, the DMAC 80 can usually perform high-speed data processing with the 16-bit width by DMA control. That is, as shown in FIG. 7, the normal operation mode is the second mode (access by DMA), and the signal level of a Wait signal outputted from the DMAC 80 to the CPU 21 is "H". In this mode, the selector 83 selects the terminal b, the selector 84 selects the terminal c, and the selector 85 selects the terminal c. Accordingly, the DMAC 80 usually holds the exclusive access right for the CPU bus 70, and the CPU 21 and the DMAC 80 are concurrently operable unless the CPU 21 accesses the memories 86 and 87.

In the above environment, if the CPU 21 needs to access the memories 86 and 87 (i.e., the operation mode is changed to the first mode (access by CPU)), the CPU 21 issues an CPU access request signal.

On the other hand, in response to the CPU access request signal, the DMAC 80 turns the signal level of the Wait signal to "L" so as to temporarily stop access by the CPU 21 to the memories 86 and 87, changes the access path to the memories 86 and 87 as shown in FIG. 7 by the selectors 83 to 85, and delivers the exclusive access right to the CPU 21. At a point where the memories 86 and 87 have become accessible for the CPU 21, the DMAC 80 turns the signal level of the Wait signal to "H".

Thereafter, the CPU 21 finds that the signal level of the Wait signal is "H", and accesses the memories 86 and 87, and clears the CPU access request signal.

The above operations are shown in the time sequence of FIGS. 8A–8E. FIGS. 8A–8E show a time sequence of memory access control in a case where the CPU accesses the memories 86 and 87. In FIGS. 8A–8E, the exclusive access right for the CPU bus 70 is delivered between the CPU 21 and the DMAC 80 in accordance with the signal level of the Wait signal transmitted between the CPU 21 and the DMAC 80, and the data bus width in memory access is dynamically changed.

Figure 8:
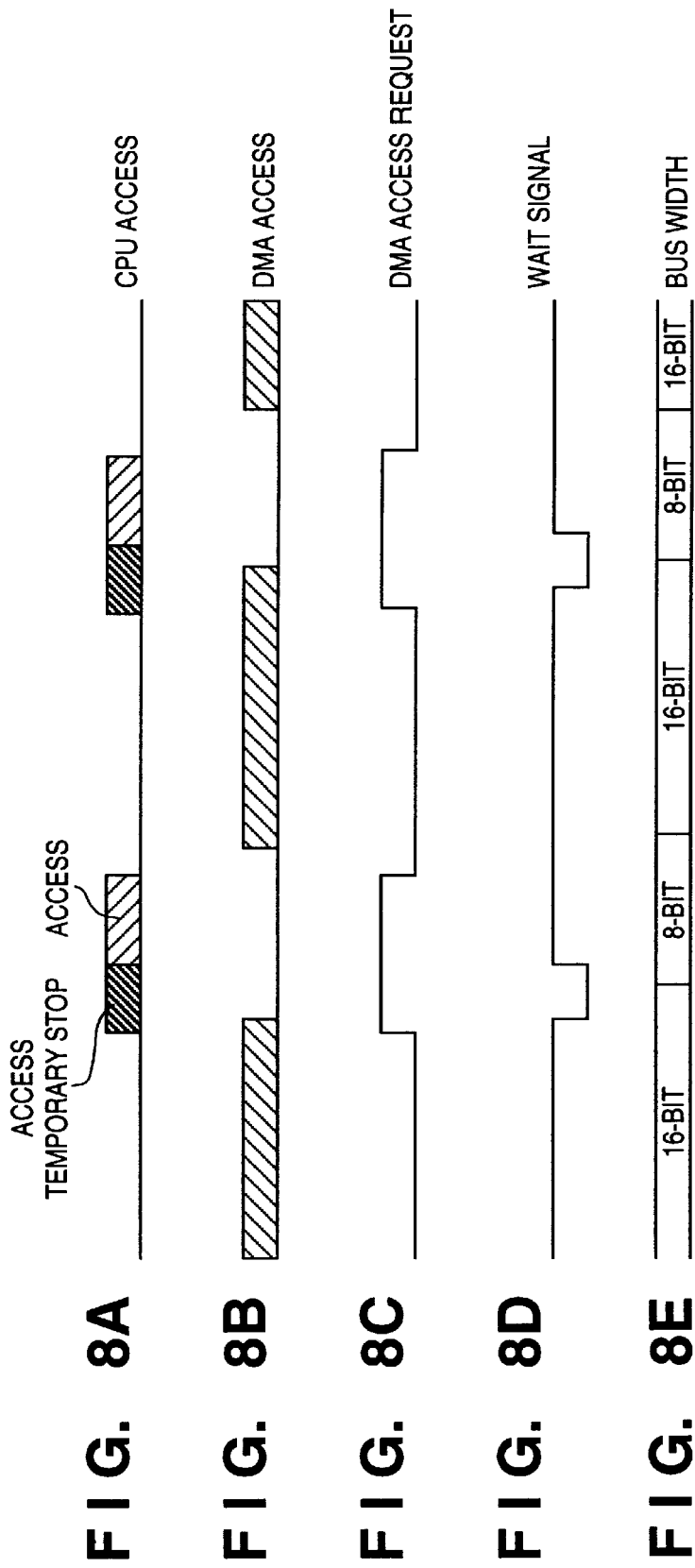
FIGS. 8A, 8B, 8C, 8D and 8E are timing charts showing a time sequence of bus width changing according to the other embodiment.

Note that FIG. 8A shows a time variation of CPU access; FIG. 8B: a time variation of DMA access; FIG. 8C: a time variation of a CPU access request signal; FIG. 8D: a time variation of a Wait signal; and FIG. 8E: a time variation of a CPU bus width.

According to this embodiment, in the construction where the DMAC usually holds the exclusive access right for the CPU bus, the access path to the memories is dynamically changed each time the CPU needs to access the memories, thereby the CPU can access the memories.

Further, in the above two embodiments, the physical bus width of the CPU bus is 16 bits, and 8-bit data transfer and 16-bit data transfer are performed. However, this does not pose any limitation on the present invention. It may be arranged such that the CPU bus employs a bus width of 32-bit or 64-bit, for example, and 8-bit, 16-bit, 32-bit and 64-bit data transfer are performed.

Furthermore, in the two embodiments, the ratio of data transfer width (16 bits) by the DMAC to that by the CPU (8 bits) holds an integer (in these cases, the ratio is equal to "2"). However, this does not pose any limitation on the present invention.

Figure 9:
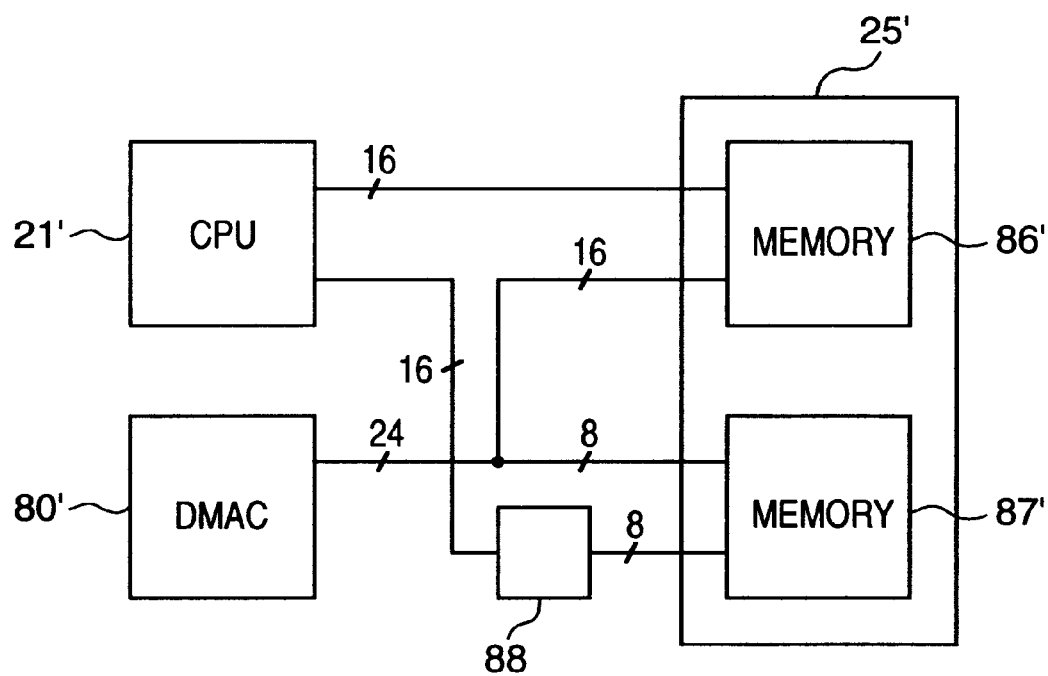
FIG. 9 is a block diagram showing data access and data transfer between a RAM 25', and a CPU 21' and a DMAC 80' according to a modification of the embodiments shown in FIG. 3.

For example, the ratio may be "1.5". As shown in FIG. 9, under condition that a 24-bit width CPU bus is employed, it may be arranged that a CPU accesses a memory with a 16-bit data width, while a DMAC accesses the memory with a 24-bit data width.

Since the construction shown in FIG. 9 is quite similar to that shown in FIG. 3, the corresponding elements in FIG. 9 have the same numerals plus apostrophe ('). In FIG. 9, a numeral 88 denotes a bus width conversion circuit for converting 16-bit width data into 8-bit width data, and/or converting 8-bit width data into 16-bit width data. In this case, effective data is only lower 8 bits, higher 8 bits or any consecutive 8 bits out of the 16-bit width data.

In the arrangement of FIG. 9, a CPU 21' has a 16-bit access width, while a DMAC 81' has a 24-bit access width. A memory 86' can input/output data with a 16-bit width, while a memory 87' can input/output data with an 8-bit width.

Out of the 24-bit width in the DMAC 80', a 16-bit width is used for accessing a memory 86', while a remaining 8-bit width is used for accessing a memory 87'. On the other hand, the CPU 21' accesses both memories 86' and 87' with a 16-bit width. However, when the memory 87' is accessed by the CPU 21', this access is performed via the bus width conversion circuit 88. More specifically, when the CPU 21' accesses the memory 87', the actual access width is converted to an 8-bit width from a 16-bit width by the bus width conversion circuit 88.

Furthermore, it may be arranged that, without using the bus width conversion circuit 88 in FIG. 9, the DMAC 80' accesses the memories 86' and 87', while the CPU 21' merely accesses the memory 86'.

It goes with saying that the ratio may be another value such as 1.333 (CPU access width: 24-bit; and DMAC access width: 32-bit).

The embodiment described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of the so-called on-demand type or a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558, 333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, an exchangeable chip type printhead which can be electrically connected to the apparatus main unit and can receive an ink from the apparatus main unit upon being mounted on the apparatus main unit or a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, in order to enhance tonality representation, it may be arranged that a plurality of printhead respectively use inks (thick color ink and thin color ink), each exhibiting the same color but different density.

Moreover, in each of the above-mentioned embodiments of the present invention, it is assumed that the ink is a liquid.

Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

Furthermore, in order to improve ink-fixing, it may be arranged that a printer uses an additional printhead for discharging processed liquid to be added to ink on a printing medium prior to/after ink discharge.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices (e.g., a host computer, an interface unit, a reader and a printer), or to an apparatus comprising a single device (e.g., a copying machine or a facsimile apparatus). Furthermore, it goes without saying that the invention is applicable to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A data processing method for accessing a memory by a CPU and a DMA controller via a bus with an N-bit physical bus width, comprising:

a first access step, of executing a first mode in which said CPU accesses said memory with an N1-bit width:

a second access steps of executing a second mode in which said DMA controller DMA-accesses said memory with an N2-bit width;

a detection step, of detecting a request as to whether to execute said first mode or second mode; and a switching steps of, based on the detection in said detection step, switching between execution of said first mode and that of said second mode, such that said CPU or said DMA controller which has an exclusive right for said bus can execute memory access, wherein N, N1 and N2 are respectively positive integers, N2 is greater than N1, and N is equal to or greater than N2.

2. The method according to claim 1, further comprising:

a request step, of issuing the request to said DMA controller or said CPU, requiring said DMA controller or CPU to obtain the exclusive access right for said bus, each time said CPU or said DMA controller needs to access said memory; and a delivery step, of delivering the exclusive access right for said bus from said DMA controller or said CPU, which has the exclusive access right for said bus, to said DMA controller or said CPU, which has required the exclusive access right for said bus, in accordance with the request.

3. The method according to claim 2, wherein the exclusive access right for said bus usually belongs to said CPU, and said DMA controller obtains the exclusive access right for said bus each time said DMA controller needs to access to said memory.

4. The method according to claim 2, wherein the exclusive access right for said bus usually belongs to said DMA controller, and said CPU obtains the exclusive access right for said bus each time said CPU needs to access to said memory.

5. A printer which accesses a memory by using a CPU an a DMA controller, comprising:

a CPU bus with an N-bit physical bus width shared by said CPU and said DMA controller;

an input unit, arranged to receive as input print data from an external device;

a detector that detects a request as to whether to execute a first mode in which said CPU accesses said memory via said CPU bus with an N1-bit width to handle said print data, or to execute a second mode in which said DMA controller accesses said memory via said CPU bus with an N2-bit width to handle the print data;

a switching unit arranged to switch an exclusive access right for said CPU bus, depending on whether executing said first mode, or executing said second mode; and a printing unit arranged to receive said print data, to print on a print medium based on said print data, wherein N, N1 and N2 are respectively positive integers, N2 is greater than N1, and N is equal to or greater than N2.

6. The printer according to claim 5, further comprising memory-access controller that, provided between said CPU bus and said memory, that selects an access path from said CPU to said memory or an access path from said DMA controller to said memory.

7. The printer according to claim 6, wherein said CPU usually holds the exclusive access right for said CPU bus.

8. the printer according to claim 7, further comprising:

a first request issuance unit that issues the request from said DMA controller to said CPU, requiring said CPU to deliver the exclusive access right for said CPU bus to said DMA controller, when said DMA controller needs to access said memory; and a first response unit that issues a permission signal to deliver the exclusive access right for said CPU bus from said CPU to said DMA controller, in response to the request issued by said first request issuance unit.

9. The printer according to claim 8, further comprising:

an access-releaser, that resets the request issued by said first request issuance unit and releases the exclusive access right for said CPU bus, after said DMA controller has completed access to said memory; and an access-reacquirer, that re-acquires the exclusive access right for said CPU bus for said CPU, in accordance with the reset of the request by said access-releaser.

10. The printer according to claim 6, wherein said DMA controller usually holds the exclusive access right for said CPU bus.

11. The printer according to claim 10, wherein said CPU has an internal memory.

12. The printer according to claim 11, further comprising:

a second request issuance unit that issues the request from said CPU to said DMA controller, requiring said DMA to deliver the exclusive access right for said CPU bus to said CPU, when said CPU needs to access said memory; and a second response unit, that issues a permission signal to deliver the exclusive access right for said CPU bus from said DMA controller to said CPU, in response to the request issued by said second request issuance unit.

13. The printer according to claim 5, wherein said printing unit has a printhead which performs printing.

14. The printer according to claim 13, wherein said printhead is an ink-jet printhead which performs printing by discharging ink.

15. The printer according to claim 14, wherein said printhead discharges the ink by utilizing thermal energy, and has a thermal energy generator for generating the thermal energy supplied to the ink.

16. The printer according to claim 13, wherein said printhead is a color printhead for performing color printing.

17. The printer according to claim 16, wherein said printhead includes;

a first printhead unit for discharging yellow ink;

a second printhead unit for discharging magenta ink;

a third printhead unit for discharging cyan ink; and a fourth printhead unit for discharging black ink.

18. The printer according to claim 16, wherein said printhead includes:

a printhead unit for discharging thin color ink; and a printhead unit for discharging thick color ink, whose color is the same as that of the thin color ink.

19. The printer according to claim 16, wherein said printhead includes:

a printhead unit for discharging ink; and an printhead unit for discharging liquid.

20. The printer according to claim 13, wherein memory access in said second mode is applied to data transfer from said memory to said printhead.

21. The printer according to claim 13, wherein memory access in said second mode is applied to data transfer of print data inputted by said input means from said external device to said memory.

22. The printer according to claim 13, wherein memory access in said second mode is applied to conversion of arrangement of print data in consideration of an array direction of printing elements of said printhead.

23. The printer according to claim 13, wherein memory access in said second mode is applied to execution of resolution conversion and smoothing on print data inputted by said input means.

24. The printer according to claim 13, wherein memory access in said second mode is applied to execution of decompression on compressed print data inputted by said input means.

25. A data processing apparatus for accessing a memory by a CPU and a DMA controller via a bus with an N-bit physical bus width, comprising:

a first memory-accesser, that executes a first mode in which said CPU accesses said memory with an N1-bit width;

a second memory-accesser, that executes a second mode in which said DMA controller DMA-accesses said memory with an N2-bit width;

a detector, that detects a request as to whether to execute said first mode or said second mode; and a switching unit that, based on the detection by said detector, switches between execution of said first mode and that of said second mode, such that said CPU or said DMA controller which has an exclusive access right for said bus can execute memory access, wherein N, N1 and N2 are respectively positive integers, N2 is greater than N1, and N is equal or greater than N2.

* * * * *

UNITED STATES PATENT AND TRADEMARK OFFICE
CERTIFICATE OF CORRECTION

PATENT NO.   : 6,144,460
DATED        : November 7, 2000
INVENTOR(S)  : Shinichi Omo et al.

It is certified that error appears in the above-identified patent and that said Letters Patent is hereby corrected as shown below:

Title page,
Item [56], U.S. Patent Documents, "LEntz et al." should read -- Lentz et al. --.
Item [56], In Foreign Patent Documents, "5456847" should read -- 54-56847 --.

Column 2,
Line 2, "According" should read -- ¶ According --;
Line 4, "controller" should read -- controller, --; and
Line 5, "," should be deleted.

Column 10,
Line 53, "width:" should read -- width; --;
Line 54, "steps" should read -- step, --; and
Line 60, "steps" should read -- step, --.

Column 11,
Line 46, "controller that," should read -- controller, --.

Column 12,
Line 32, "includes;" should read -- includes: --; and
Line 48, "an" should read -- a --.

Signed and Sealed this

Twenty-seventh Day of November, 2001

*Attest:*

NICHOLAS P. GODICI
*Attesting Officer*   Acting Director of the United States Patent and Trademark Office